(12) United States Patent
Qu

(10) Patent No.: US 10,212,009 B2
(45) Date of Patent: Feb. 19, 2019

(54) MODULATION FOR A DATA BIT STREAM

(71) Applicant: BlackBerry Limited, Waterloo (CA)

(72) Inventor: Shouxing Qu, Gloucester (CA)

(73) Assignee: BlackBerry Limited, Waterloo, Ontario (CA)

( * ) Notice: Subject to any disclaimer, the term of this patent is extended or adjusted under 35 U.S.C. 154(b) by 39 days.

(21) Appl. No.: 15/451,071

(22) Filed: Mar. 6, 2017

(65) Prior Publication Data
US 2018/0254933 A1    Sep. 6, 2018

(51) Int. Cl.
*H04L 25/49* (2006.01)
*H04L 27/04* (2006.01)
*H04L 27/06* (2006.01)

(52) U.S. Cl.
CPC ............. *H04L 27/04* (2013.01); *H04L 27/06* (2013.01)

(58) Field of Classification Search
CPC ..... H04L 25/4917; H04L 5/06; H04L 27/063; H04L 27/0008; H04L 27/2017; H04L 25/03834; H04L 27/12; H04L 27/02; H03K 7/02; H04B 14/02; H04B 1/16; H04B 1/163; H04J 3/00; H03D 1/16; H03D 11/02; H03C 3/40
USPC ................ 375/259, 268, 295, 300–301, 316, 375/320–321, 353, 354, 359–364
See application file for complete search history.

(56) References Cited

U.S. PATENT DOCUMENTS

| | | | | |
|---|---|---|---|---|
| 4,406,009 A | * | 9/1983 | Lender | .................... H04L 27/02 375/263 |
| 5,638,435 A | * | 6/1997 | Axling | ..................... H04Q 1/50 379/286 |
| 5,648,822 A | * | 7/1997 | Hulyalkar | ......... H03M 13/1515 348/21 |
| 5,661,750 A | * | 8/1997 | Fulton | .................... H04B 1/707 375/141 |
| 5,677,681 A | * | 10/1997 | Tanaka | ................ H04W 88/187 340/4.21 |
| 5,893,061 A | * | 4/1999 | Gortz | .................... G10L 19/113 704/262 |
| 6,366,600 B1 | * | 4/2002 | Agrawal | ................ H04B 1/707 375/130 |
| 6,535,545 B1 | * | 3/2003 | Ben-Bassat | ........ H04B 1/70712 375/142 |
| 6,618,392 B1 | * | 9/2003 | Bray | ..................... H04J 3/0688 370/463 |

(Continued)

OTHER PUBLICATIONS

Shouxing Qu, U.S. Appl. No. 15/063,954 entitled Method and Apparatus for I-Q Decoupled OFDM Modulation and Demodulation filed Mar. 8, 2016 (71 pages).

(Continued)

*Primary Examiner* — James M Perez
(74) *Attorney, Agent, or Firm* — Trop, Pruner & Hu, P.C.

(57) ABSTRACT

In some examples, a binary bit stream of input bits is encoded into a three-amplitude bipolar symbol stream of symbols, the encoding using a coding rule that specifies setting a value of a respective symbol of the symbol stream based on a respective input bit of the binary bit stream and a prior input bit of the binary bit stream that is prior to the respective input bit, the coding rule further specifying that adjacent non-zero pulses keep the same polarity. A radio frequency (RF) carrier signal is modulated using the symbol stream to produce a modulated RF signal.

21 Claims, 6 Drawing Sheets

(56) References Cited

U.S. PATENT DOCUMENTS

| | | | | |
|---|---|---|---|---|
| 8,867,657 | B1* | 10/2014 | Flake | H04B 10/524 327/10 |
| 8,873,592 | B1* | 10/2014 | Mohan | H03M 5/16 341/56 |
| 9,172,567 | B2* | 10/2015 | Hollis | G06F 13/38 |
| 2002/0075068 | A1* | 6/2002 | Hsu | H03F 3/2173 330/10 |
| 2004/0120424 | A1* | 6/2004 | Roberts | H04B 1/7163 375/327 |
| 2005/0259772 | A1* | 11/2005 | Voutilainen | H04L 7/0083 375/353 |
| 2007/0086546 | A1* | 4/2007 | Koo | H04L 25/069 375/340 |
| 2008/0080598 | A1* | 4/2008 | Mo | H04L 27/0008 375/219 |
| 2008/0187069 | A1* | 8/2008 | Qu | H04L 27/2615 375/295 |
| 2009/0154500 | A1* | 6/2009 | Diab | H04L 12/40032 370/477 |
| 2010/0027710 | A1* | 2/2010 | Fukuda | H04L 25/4917 375/293 |
| 2010/0164539 | A1* | 7/2010 | Balamurugan | H03K 19/018585 326/30 |
| 2010/0201885 | A1* | 8/2010 | Ji | H03M 13/2906 348/608 |
| 2010/0215118 | A1* | 8/2010 | Ware | H03M 5/16 375/295 |
| 2013/0028299 | A1* | 1/2013 | Tsai | H04L 25/03057 375/219 |
| 2013/0195155 | A1* | 8/2013 | Pan | H03D 1/00 375/219 |
| 2015/0100107 | A1* | 4/2015 | Kiani | A61B 5/0488 607/59 |
| 2015/0341160 | A1* | 11/2015 | Takai | H04L 25/085 375/346 |
| 2016/0013958 | A1* | 1/2016 | Mishra | H04L 25/06 375/287 |
| 2016/0261440 | A1* | 9/2016 | Jos | H04L 25/4923 |
| 2016/0278013 | A1* | 9/2016 | Shellhammer | H04W 52/0225 |
| 2017/0063579 | A1* | 3/2017 | Park | H04L 25/4923 |
| 2018/0115952 | A1* | 4/2018 | Shellhammer | H04L 43/0847 |
| 2018/0152333 | A1* | 5/2018 | Shellhammer | H04L 1/0023 |
| 2018/0254933 | A1* | 9/2018 | Qu | H04L 27/06 |

OTHER PUBLICATIONS

Windisch et al., On the Impact of I/Q Imbalance in Multi-Carrier Systems for Different Channel Scenarios, May 2007 (4 pages).

Interdigital Communications, IEEE 802.11-15/1314r2, Powerpoint Presentation, I/Q Imbalance Impact to TGax OFDMA Uplink Reception, Nov. 2015 (22 pages).

Shouxing Qu, U.S. Appl. No. 15/342,865 entitled Communication With I-Q Decoupled OFDM Modulation filed Nov. 3, 2016 (47 pages).

Park et al., IEEE 802.11-16/0341r0, LP-WUR (Low-Power Wake-Up Receiver) Follow-Up, Mar. 2016 (9 pages).

Li et al., COL 12(10), 100604(2014) Chinese Optics Letters, 200 Mb/s visible optical wireless transmission based on NRZ-OOK modulation of phosphorescent white LED and a pre-emphasis circuit, Oct. 10, 2014 (4 pages).

Ali et al., Comparison of NRZ, RZ-OOK Modulation Formats for FSO Communications under Fog Weather Condition, International Journal of Computer Applications (0975-8887) vol. 108—No. 2, Dec. 2014 (6 pages).

Wikipedia, MLT-3 encoding last modified on Feb. 24, 2015 (2 pages).

Canadian Intellectual Property Office, International Search Report and Written Opinion for PCT/CA2018/050218 dated May 8, 2018 (7 pages).

Veetil et al., Highly Linear and Reconfigurable Three-Way Amplitude Modulation-Based Mixerless Wireless Transmitter, IEEE Transactions on Microwave Theory and Techniques, vol. 66, No. 3, Abstract Only, Mar. 2018 (4 pages).

* cited by examiner

MODULATION FOR A DATA BIT STREAM

BACKGROUND

Electronic devices such as computers, handheld devices, or other types of devices can communicate over wired or wireless networks. Wireless networks can include a wireless local area network (WLAN), which includes wireless access points (APs) to which devices are able to wirelessly connect. Other types of wireless networks include cellular networks that include wireless access network nodes to which devices are able to wirelessly connect.

BRIEF DESCRIPTION OF THE DRAWINGS

Some implementations of the present disclosure are described with respect to the following figures.

Figure 1:
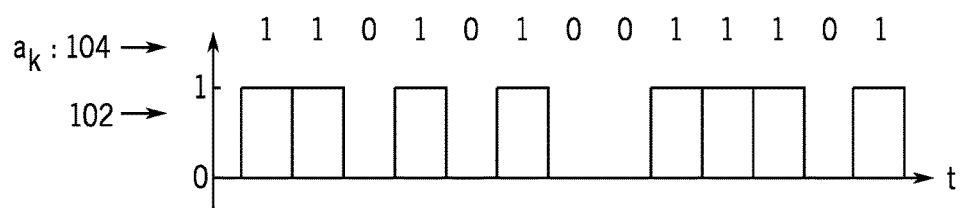
FIG. 1 is a graph of a baseband waveform for a regular non-return-to-zero (NRZ) on-off keying (OOK) signal, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

To communicate data over a network (either a wired network or a wireless network), modulation is applied. In cases where an electronic device that communicates data is a low-power device (such as a battery-powered device or a device powered by another type of power source with restricted power capacity), a modulation scheme that is used should be relatively simple with low power consumption and latency. Examples of modulation schemes include the on-off keying (OOK) modulation scheme or the pulse-position modulation (PPM) scheme.

As an example, the Institute of Electrical and Electronics Engineers (IEEE) 802.11ba task group is developing specifications for a simple physical (PHY) and Medium Access Control (MAC) standard for low data rate transmission for the application referred to as wake-up receiver (WUR). In an example scenario, an access point (AP) of a WLAN transmits a WUR signal to wake up a battery-powered device in deep sleep before starting to send the payload data. In general, a WUR receiver, which is powered by a small battery or button cell or other power source that has a low power capacity, has to be simple with very low power consumption and latency. However, a WUR transmitter in the AP can be more complex and can have a higher power consumption than a WUR receiver, since the AP has a more robust power source.

Although reference is made to IEEE 802.11 standards in some examples, it is noted that in other examples, modulation solutions according to some implementations of the present disclosure can be applied to other types of communications networks, such as Long-Term Evolution (LTE) cellular networks operating according to standards provided by the Third Generation Partnership Project (3GPP), $5^{th}$ Generation (5G) and beyond cellular networks, other types of wireless networks, and/or wired networks.

A modulator in a transmitter that applies a modulation scheme receives a stream of input data bits that is to be transmitted. The input data bits are mapped to a stream of symbols, where each symbol represents a respective group of one or more data bits of the input data bit stream, and the symbols collectively form a sequence that is used to modulate one or more radio frequency (RF) carriers that are used to communicate data over a communication medium (either a wireless medium or a wired medium).

An OOK signal (a signal modulated using the OOK modulation scheme) that is transmitted from a transmitter to a receiver can be non-coherently demodulated in the receiver with a very simple envelope detector (ED). For example, an envelope detector used by a receiver for demodulating an OOK signal includes the following passive components: a diode, a capacitor, and a resistor. With such a simple demodulation implementation, the power consumption of the receiver is very low. As a result, the OOK modulation scheme can be a viable modulation scheme for use with low-power receivers.

The on-off key (OOK) modulation is a simple binary modulation scheme. An OOK signal can be described by its baseband signal, s(t), $$s(t) = \Sigma_k a_k g\left(\frac{t-kT}{T}\right), \quad \text{(Eq. 1)}$$

where T is the interval of each symbol, $a_k$ represents an input binary bit (which can have a value of 0 or 1), and $$g\left(\frac{t-kT}{T}\right)$$

represents a pulse waveform in the duration from kT to (k+1)T.

A non-return-to-zero (NRZ) OOK signal is an OOK signal where the pulse waveform, $$g\left(\frac{t-kT}{T}\right),$$

is based on an NRZ gate function, as set forth below:

$$g(t) = \begin{cases} 1, & \text{for } 0 \leq t < 1 \\ 0, & \text{otherwise} \end{cases} \quad \text{(Eq. 2)}$$

According to Eq. 2, the pulse waveform g(t) has a value of 1 in the time window of 0 to T, and a value of zero outside this time window. Eq. 1 and Eq. 2 indicate that when an input data bit $a_k$ is 1, an RF pulse of unit amplitude and duration T is transmitted, and, when an input data bit $a_k$ is 0, no signal is transmitted. FIG. 1 shows an example of the baseband OOK waveform 102 corresponding to an input data bit stream, $\{a_k\} = \{1, 1, 0, 1, 0, 1, 0, 0, 1, 1, 1, 0, 1\}$.

Figure 2:
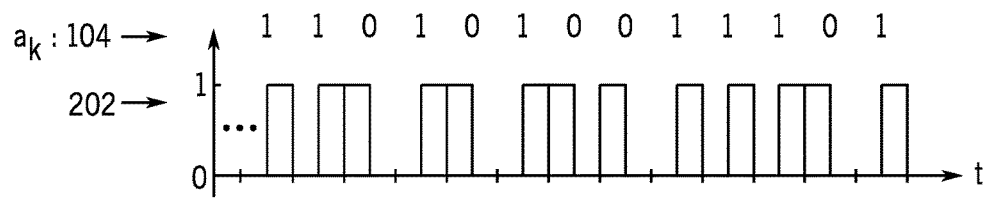
FIG. 2 a graph of a baseband waveform for a regular pulse-position modulation (PPM) signal, according to some examples.

In the pulse-position modulation (PPM) scheme, which is another binary modulation scheme, each symbol interval of T is split into two equal subintervals, wherein one of the two subintervals is used to transmit a positive NRZ RF pulse of duration T/2 and another subinterval is idle. Corresponding to an input bit $a_k$, the positive NRZ pulse is transmitted in the first or the second subinterval, depending on the value of $a_k$. In other words, the information of the input bit is carried by the pulse position. FIG. 2 shows an example of the baseband waveform 202 of the PPM signal assuming that $a_k=0$ and $a_k=1$ are respectively represented by the first and second subintervals where the NRZ pulse is transmitted.

With the PPM scheme, similar to the Manchester code used for binary data communication, a PPM signal (a signal modulated using the PPM scheme) transmitted from a transmitter to a receiver has a feature that there is an amplitude level transition in every symbol interval. This helps the receiver to extract clock timing information from the received PPM signal to achieve clock synchronization with a clock of the transmitter, even in the presence of long strings of 0 s or 1 s in the input bit stream.

The passband null-to-null bandwidth of an NRZ OOK signal is 2/T. This means that approximately a bandwidth of 2/T Hertz (Hz) is needed to transmit a symbol in T seconds. Furthermore, if the PPM scheme instead of the OOK modulation scheme is used to facilitate clock synchronization in the receiver, an even wider bandwidth (as wide as 4/T) is needed. These bandwidth requirements correspond to lower bandwidth efficiencies, since from the theory of Nyquist rate, the minimum passband bandwidth for transmitting a symbol in T seconds without inter-symbol interference is 1/T Hz. In communication systems, frequency bandwidth is a precious resource, and a higher bandwidth efficiency of a transmitted signal from a transmitter to a receiver is desired.

At the same time, an important constraint specific to the application of a low-power device is that the modulated signal should be detectable in the low-power receiver with the same simple envelope detector (ED) used for demodulating the regular NRZ OOK or the regular PPM signal without extra complexity, and without degradation of an error rate performance (ERP).

In accordance with some implementations of the present disclosure, modified versions of the OOK modulation scheme and/or the PPM scheme are provided. The modified versions of the OOK and PPM schemes allow for demodulation using similar receiver complexity as for demodulating regular OOK or PPM signals, respectively, while achieving higher spectrum/bandwidth efficiencies.

In some examples, a modified version of the OOK modulation scheme is referred to as a narrowband bipolar OOK (NBB OOK), while a modified version of the PPM scheme is referred to as a bipolar pulse-position modulation (BPPM) scheme. In some examples, while the signals of these modified modulation schemes can be non-coherently demodulated using the same demodulation schemes for the regular OOK and regular PPM, respectively, with the similar receiver complexity and without degradation of bit error rate (BER) performance, they have the advantage of providing higher spectrum efficiencies.

Figure 3:
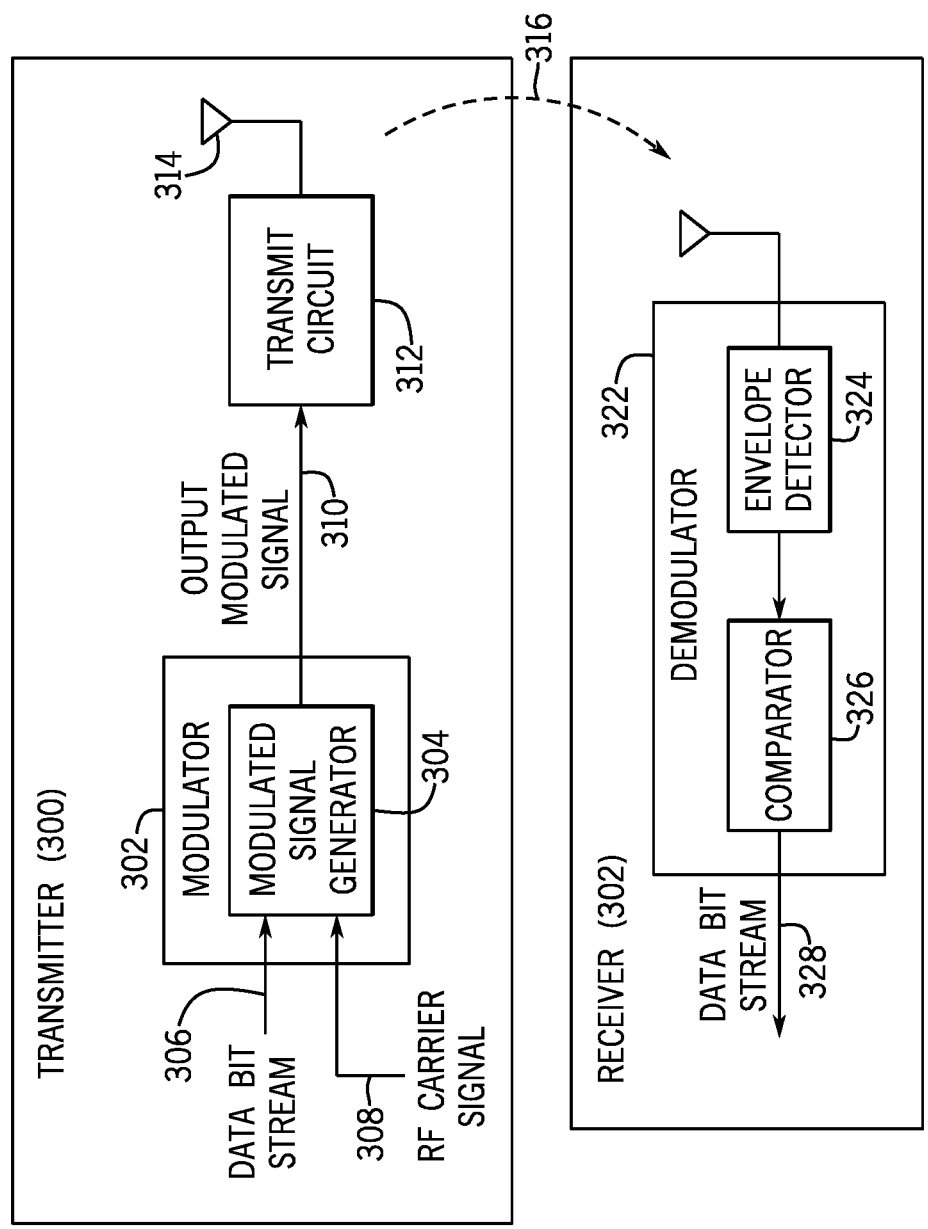
FIG. 3 is a block diagram of an example arrangement that includes a transmitter and a receiver, according to some implementations.

FIG. 3 is a block diagram of an example arrangement including a transmitter 300 and a receiver 302 that are able to use modulation schemes according to some implementations of the present disclosure. In a WLAN, the transmitter 300 can be an AP, while the receiver 302 can be an electronic device, such as a low-power device. Examples of electronic devices can include sensors, cameras, thermostats, household appliances, vehicles, and so forth. In further examples, electronic devices can include smartphones, wearable devices, tablet computers, notebook computers, desktop computers, server computers, communication nodes (e.g., switches or routers), storage devices, game appliances, television set-top boxes, and so forth.

In some examples, receivers can include Internet-of-Things (IoT) devices. In addition to network traffic communicated by computers, smartphones, wearable devices, and the like, the IoT technology paradigm contemplates that other types of devices, including sensors, cameras, thermostats, household appliances, vehicles, have network connectivity to allow the devices to communicate respective data.

The transmitter 300 includes a modulator 302 that has a modulated signal generator 304 according to some examples. The modulated signal generator 304 receives input binary bits of a data bit stream 306 (also referred to as a binary bit stream) and a radio frequency (RF) carrier signal 308, and produces an output modulated signal 310 using modulation schemes according to some implementations of the present disclosure. The output modulated signal 310 is produced by modulating the RF carrier signal 308 using symbols produced by the modulation scheme according to some implementations of the present disclosure.

The data bit stream 306 can be received from another processing circuit in the transmitter 300, such as a processor, an input/output (I/O) electronic component, and so forth.

The output modulated signal 310 is provided to a transmission circuit 312. In some examples, the transmission circuit 312 can include an RF power amplifier that amplifies the output modulated signal 310 for transmission by an antenna 314 of the transmitter 300 over the air as a transmitted signal 316.

The transmitted signal 316 is received by an antenna 320 of the receiver 302. The receiver 302 includes a demodulator 322 that includes an envelope detector 324 and a comparator 326. The envelope detector 322 is an electronic circuit that receives a signal of a specified frequency (the frequency of the RF carrier signal 308) and produces an output that is the envelope of the received RF signal.

The output of the envelope detector 324 is provided to a comparator 326, which compares the output of the envelope detector 324 to a specified criterion (or criteria) to estimate the bit value (e.g., value 0 or 1) of the original data bit value based on the received signal.

The demodulator 322 outputs a data bit stream 328, which corresponds to the data bit stream 306 transmitted by the transmitter 300 (in other words, ideally the sequence of bits in the data bit stream 328 should be the same as the sequence of bits in the data bit stream 306, unless an error occurred). The data bit stream 328 including an output binary bits from the demodulator 322 may be sent to another processing circuit in the receiver 302, such as a processor, an I/O electronic component, and so forth, for further processing In examples where the receiver 302 is a wake-up receiver (WUR), the transmitted signal 316 from the transmitter 300 can be a wake-up signal that is used to awaken the receiver 302 from a power-saving sleep state to a working state. In other examples, the transmitted signal 116 can carry other information (control signals or data traffic signals) from the transmitter 300 to the receiver 302.

In some examples, for each input bit of the data bit stream 306 received by the modulated signal generator 304 in the transmitter 300 produces a respective symbol. Thus, for a sequence of input bits, a corresponding sequence of symbols (referred to as a "symbol stream") is produced by the modulated signal generator 304. The modulated signal generator 304 encodes the binary bits of the data bit stream 406 into a three-amplitude bipolar symbol stream of symbols. Each symbol of the three-amplitude bipolar symbol stream of symbols selectively has a value of −1, 0, or +1.

The symbol stream produced by the modulated signal generator 304 is used to modulate the RF carrier 308 in the modulated signal generator 304, to produce the output modulated signal 310.

In accordance with some implementations of the present disclosure, the modulated signal generator 304 applies encoding on the data bit stream 306 that uses a coding rule that specifies:

1) that a value of a current symbol of the symbol stream is set based on a current input bit of the data bit stream 306 and a prior input bit of the data bit stream 306 that is immediately prior to the current input bit,
2) that adjacent non-zero pulses of the symbol stream keep the same polarity, and
3) that non-adjacent non-zero pulses of the symbol stream toggle their polarity alternately (in other words, the non-adjacent non-zero pulses have opposite polarities).

Note that a symbol can be set to any one of three amplitudes, +1, 0, −1, depending on an input bit value. However, note that a pulse transmitted within an interval of the symbol, or a subinterval of the symbol, is non-zero, i.e., the pulse can be set to a positive polarity (+1) or a negative polarity (−1).

Narrowband Bipolar On-Off Keying (NBB OOK) Modulation Scheme

In some examples, the modulated signal generator 304 of the modulator 302 in the transmitter 300 of FIG. 3 is able to generate the output modulated signal 310 according to the NBB OOK modulation scheme, which is a modified version of the regular OOK modulation scheme with greater spectrum efficiency than the regular OOK modulation scheme.

The data bit stream 306 can be represented as $\{a_k\}$, k=0, 1, 2, . . . , where $a_k$ can have either value 0 or 1 (i.e., either one of the two elements of a binary set). The modulated signal generator 304 can apply encoding using a coding rule to produce a symbol stream that includes symbols represented as $\{b_k\}$, k=0, 1, 2, . . . , where $b_k$ can also be referred to as a baseband signal.

Table 1 below shows an example of a coding rule for mapping an input bit, $a_k$, of the input binary bit stream to a respective value of a symbol, $b_k$.

TABLE 1

| $a_k$ | $a_{k-1}$ | $b_k$ |
|---|---|---|
| 0 | 0 | 0 |
| 0 | 1 | 0 |
| 1 | 0 | Toggle pulse polarity |
| 1 | 1 | Keep same pulse polarity |

Table 1 includes four rows corresponding to the following combination of values of $a_k$ and $a_{k-1}$, denoted as ($a_k$, $a_{k-1}$): first row (0, 0); second row (0, 1); third row (1, 0); and fourth row (1, 1). In Table 1 above, $a_{k-1}$ represents a prior input bit (received at time instance k−1) that is immediately prior to $a_k$ (received at time instance k). Thus, it can be seen that a value of the symbol $b_k$ is based on a current input bit $a_k$ and the immediately prior input bit $a_{k-1}$.

Note that Table 1 shows one example of the coding rule that can be applied by the NBB OOK modulation scheme. In other examples, a different coding rule can be used for the NBB OOK modulation scheme.

According to the coding rule of Table 1, $a_k$=0 (first and second rows of Table 1) is mapped to $b_k$=0, and $a_k$=1 (third and fourth rows of Table 1) is mapped to $|b_k|$=1 (i.e., the absolute value of the symbol, $b_k$, is 1), that is, $a_k$=1 is either mapped to +1 or mapped to −1. More specifically, according to the coding rule of Table 1, if $a_k$=1 and $a_{k-1}$=0, then the polarity (also referred to as the "pulse polarity") of $b_k$ is toggled from the polarity of the last non-zero symbol. The last non-zero symbol is the symbol $b_x$ having a non-zero value (i.e., +1 or −1) prior to $b_k$, where x is the closest prior time instance to k. On the other hand, if $a_k$=1 and $a_{k-1}$=1, then the pulse polarity of the symbol $b_k$ is maintained the same as the pulse polarity of the prior symbol $b_{k-1}$.

The NBB OOK modulation scheme retains the property that $|b_k|$=$a_k$. Thus, in a non-coherent receiver, when the envelope detector (e.g., 324 in FIG. 3) is making a decision on $|b_k|$, equivalently the envelope detector is making a decision on $a_k$ directly. The benefit of this coding rule is that, in the receiver 302, a received signal modulated using the NBB OOK modulation scheme can be demodulated using the same envelope detector as used for regular NRZ OOK non-coherent demodulation without having to provide an extra decoder.

Figure 4:
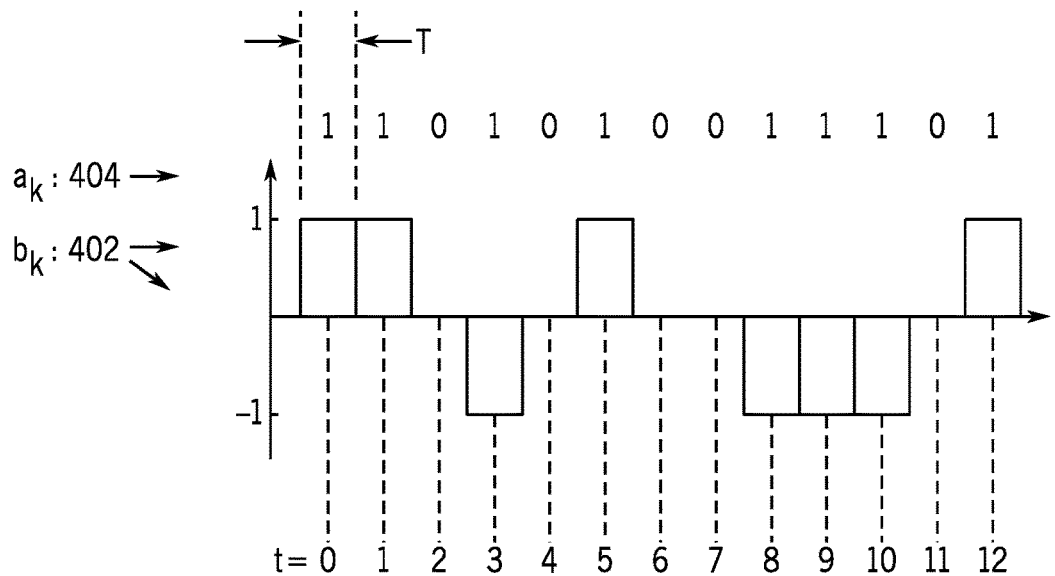
FIG. 4 is a graph of a baseband waveform for a narrow-band bipolar on-off keying (NBB OOK) modulation signal, according to some examples.

FIG. 4 shows an example of a baseband waveform 402 (a symbol stream including symbols $b_k$) for an NBB OOK signal corresponding to an input data bit stream 404, $\{a_k\}$={1, 1, 0, 1, 0, 1, 0, 0, 1, 1, 1, 0, 1}. In the example, 13 input bits are present in the input data bit stream 404, at time instances 0, 1, 2, 3, . . . , 12, respectively. The amplitude of a current symbol, $b_k$, is determined by both the current and previous input bits $a_k$ and $a_{k-1}$, as illustrated by Table 1, and as described in more detail further below.

Each symbol $b_k$ lasts a specified symbol duration T with an amplitude that is selectively set to one of −1, 0, +1 based on the current and previous input bits $a_k$ and $a_{k-1}$.

As shown in FIG. 4, at time 1, the value of $b_1$ is based on the combination set forth in the fourth row of Table 1, since $a_1$=1 (at time 1) and $a_0$=1 (at time 0). According to the fourth row of Table 1, $b_1$ keeps the same polarity as the prior symbol, $b_0$. Thus, $b_1$ is set to the same polarity as $b_0$.

The value of $b_2$ at time 2 ($b_2$ set to 0) is based on the combination set forth in the second row of Table 1, since $a_2$=0 at time 2, and $a_1$=1 at time 1. The value of $b_3$ at time 3 ($b_3$ set to −1) is based on the combination in the third row of Table 1, since $a_3=1$ (at time 3) and $a_2=0$. (at time 2). According to the third row of Table 1, the value of $b_3$ is toggled from the last non-zero symbol, which in the example of FIG. 4 is $b_1$ at time 1.

In other examples, instead of the coding rule represented by Table 1, a different coding rule can be used for the NBB OOK modulation scheme. For example, in the alternative coding rule, Table 1 can be modified such that $a_k=1$ is mapped to $b_k=0$, and $a_k=0$ is mapped to $|b_k|=1$.

Thus, the coding rule for NBB OOK modulation scheme can more generally specify the following:

1) If a current input bit $a_k$ is equal to a first element of the binary set (i.e., either 1 or 0), then the current symbol $b_k$ is set to 0. Note that the binary set includes two elements 0 and 1, where either one can be viewed as the first element and the other one is the second element.
2) If the current input bit $a_k$ and the prior input bit $a_{k-1}$ both are equal to the second element of the binary set, then the current symbol $b_k$ is set to +1 or −1, and the polarity of the current symbol $b_k$ is unchanged from a polarity of the prior symbol $b_{k-1}$ in the symbol stream.
3) If the current input bit $a_k$ is equal to the second element of the binary set, and the prior input bit $a_{k-1}$ is equal to the first element of the binary set, then the current symbol $b_k$ is +1 or −1, and the polarity of the current symbol $b_k$ is toggled from the polarity of the prior symbol $b_{LNZ}$ which is the last non-zero symbol prior to $b_k$.

Even more generally, the coding rule applied by the NBB OOK modulation scheme specifies that a value of a current symbol of the symbol stream is set based on a current input bit of the data bit stream 404 and a prior input bit of the data bit stream 404 that is immediately prior to the current input bit, adjacent non-zero pulses of the symbol stream keep the same polarity, and non-adjacent non-zero pulses of the symbol stream toggle their polarity alternately.

In the case of the NBB OOK modulation scheme, a "pulse" corresponds to the entire width (T) of a symbol with a non-zero amplitude. As seen in FIG. 4, adjacent non-zero symbols $b_0$ and $b_1$ have the same polarity (+1), adjacent non-zero symbols $b_8$ and $b_9$ have the same polarity (−1), and adjacent non-zero symbols $b_9$ and $b_{10}$ have the same polarity (−1). Also as seen in FIG. 4, non-adjacent non-zero pulses $b_1$ and $b_3$ of the symbol stream toggle their polarity alternately, non-adjacent non-zero pulses $b_3$ and $b_5$ of the symbol stream toggle their polarity alternately, and so forth.

The baseband NBB OOK waveform varies its amplitude more smoothly than the regular NRZ OOK waveform due to the correlation introduced into the symbols. Thus, the spectrum efficiency of the resultant NBB OOK signal is significantly higher than that of the regular NRZ OOK. Moreover, the baseband NBB OOK waveform does not have a discrete direct current (DC) component since both +1 and −1 symbol values are used with an equal probability.

In some examples, the coding rule of Table 1 can be expressed as:

$$b_k = a_k(a_{k-1}b_{k-1} - \bar{a}_{k-1}b_{LNZ})$$ (Eq. 3)

where $\bar{a}_{k-1} = 1 - a_{k-1}$. Eq. 3 describes the following coding rule:
1) If $a_k=0$, $b_k=0$.
2) Otherwise, if $a_k=a_{k-1}=1$, $b_k=b_{k-1}$, i.e., transmit the pulse $b_k$ with a polarity that is the same as the prior symbol.
3) Otherwise if $a_k=1$ and $a_{k-1}=0$, $b_k=-b_{LNZ}$, i.e. transmit the pulse $b_k$ with opposite polarity of the last non-zero symbol ($b_{LNZ}$).

An important feature of this coding rule is that $|b_k|=a_k$, that is, $a_k=0$ is mapped to $b_k=0$, and $a_k=1$ is mapped to $|b_k|=1$, as shown in FIG. 4. Thus, in a non-coherent receiver, while the demodulator (e.g., 322 in FIG. 3) is making a decision on $|b_k|$, equivalently the demodulator is making a decision of $a_k$ directly.

Figure 5:
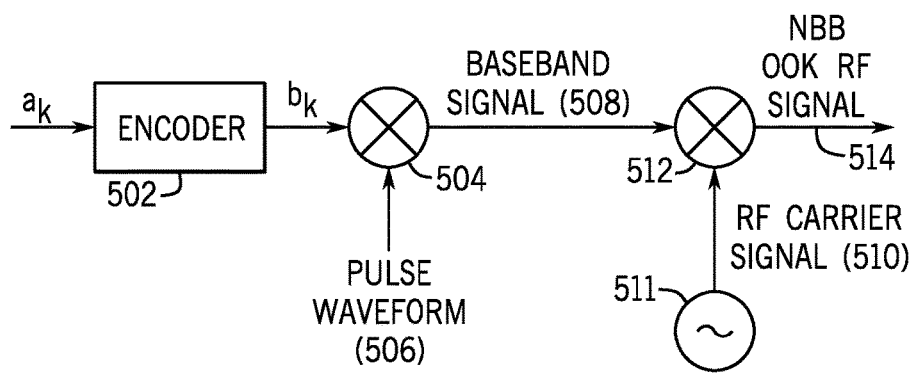
FIG. 5 is a schematic diagram of an NBB OOK modulator according to some examples.

FIG. 5 is a block diagram illustrating the relationship between the baseband and passband signals of the NBB OOK modulation scheme, where the coding rule of Eq. 5 is implemented by an encoder 502. The encoder 502 receives an input bit $a_k$ and outputs a symbol $b_k$.

A multiplier 504 multiplies the symbol $b_k$ with a pulse waveform 506, $$g\left(\frac{t-kT}{T}\right),$$

as expressed by Eq. 2 above. The resultant baseband signal 508, s(t), from the multiplier 504 is used to modulate, by a multiplier 512, an RF carrier signal 510 to produce the NBB OOK RF signal 514. The RF carrier signal 510 is produced by an RF carrier source 511, and is represented as $\cos(\omega_c t)$ where $\omega_c=2\pi f_c$ with $f_c$ representing the RF carrier frequency.

Figure 6:
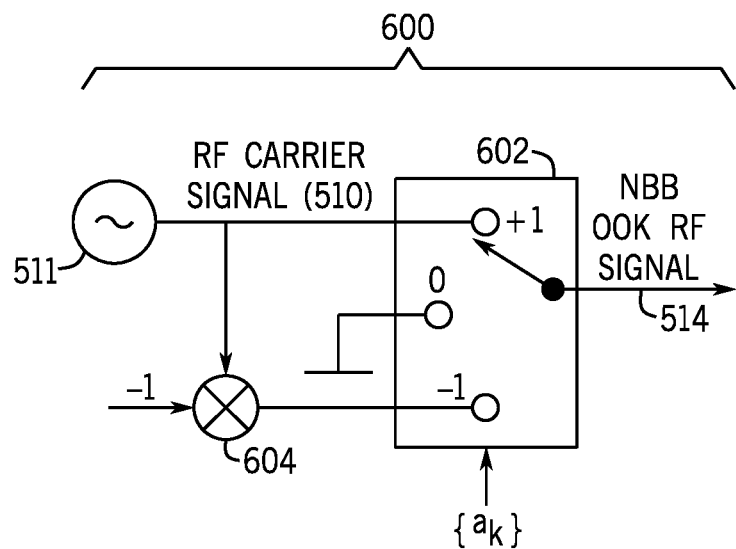
FIG. 6 is a schematic diagram of an NBB OOK modulated signal generator according to some examples.

FIG. 6 is an equivalent modulated signal generator 600 of the NBB OOK signal 514. The modulated signal generator 600 applies the same logic as the circuitry shown in FIG. 5. The modulated signal generator 600 is an example of the modulated signal generator 304 in the transmitter 300 of FIG. 3. Although a specific example of the modulated signal generator 600 is shown in FIG. 6, it is noted that in other examples, other circuit arrangements can be used to produce the NBB OOK signal 514.

The modulated signal generator 600 includes a switch 602 and a multiplier 604. The switch 602 has three input terminals: +1 terminal, 0 terminal, −1 terminal. The +1 terminal is connected to the RF carrier signal 510, the 0 terminal is connected to a 0 value (e.g., ground), and the −1 terminal is connected to an inverse of the RF carrier signal 510, produced by the multiplier 604 which multiplies the RF carrier signal 510 by −1.

Stated differently, the multiplier 604 has a multiplier factor of −1, and the multiplier 604 generates an inverse signal that is the same as the RF carrier signal 510 but with opposite polarity.

The output of the switch 602 is the NBB OOK RF signal 514. The output of the switch 602 is controlled by the value of an input bit $a_k$ that is provided to a control input of the switch 602, such that the output of the switch 602 is connected to the 0 terminal in response to the input bit $a_k$ being 0, and the output of the switch 602 stays connected to the 0 terminal until an input bit $a_k$ set to 1 arrives.

Figure 7:
FIG. 7 illustrates a transition pattern for a switch of the NBB OOK modulated signal generator according to some examples.

In response to the input bit $a_k$ being 1, the output of the switch 602 is connected to either the +1 terminal or the −1 terminal, according to the state transition pattern shown in FIG. 7, and the output of the switch 602 stays connected to the respective +1 or −1 terminal until the next input bit $a_k$ with value 0 arrives. The state transition pattern shown in FIG. 7 specifies that when the input bit $a_k$ changes from 0 to 1, the output of the switch 602 changes from the 0 terminal to the −1 terminal if the previous change of the switch 602 was from the +1 terminal to the 0 terminal. On the other hand, the state transition pattern shown in FIG. 7 specifies that when the input bit $a_k$ changes from 0 to 1, the output of the switch 602 changes from the 0 terminal to the +1 terminal if the previous change was from the −1 terminal to the 0 terminal.

Figure 8:
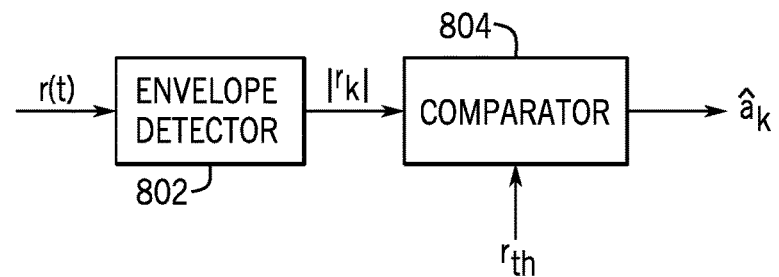
FIG. 8 is a block diagram of a demodulator in a receiver to demodulate an NBB OOK signal according to some examples.

FIG. 8 shows an example of non-coherent demodulator that uses an envelope detector 802 and a comparator 804 (which correspond to the envelope detector 324 and the comparator 326, respectively, of FIG. 3). The envelope detector 802 receives an NBB OOK signal r(t) transmitted over the air. The envelope detector 802 outputs a value $|r_k|$ that represents the envelope of r(t) for the k-th symbol interval. The comparator 804 compares $|r_k|$ to a threshold $r_{th}$, and outputs a data bit $\hat{a}_k$ (which represents the estimated (or, recovered) version of the input data bit $a_k$) that has a value set based on the comparison performed by the comparator 804. The comparator 804 sets $\hat{a}_k=0$ if $|r_k|$ is less than the threshold $r_{th}$, and sets $\hat{a}_k=1$ if $|r_k|$ is greater than the threshold $r_{th}$.

The envelope detector 802 used for demodulation of the regular NRZ OOK signal can be directly used for non-coherent demodulation of this NBB OOK signal without an extra decoder, and provides the same error rate performance in the additive white Gaussian noise (AWGN) channel. Thus, the NBB OOK signal is applicable to a low-power receiver, such as a WUR, without increasing the receiver complexity, although the transmitter complexity is slightly increased with a more complex generator.

In other examples, the NBB OOK signal produced by the NBB OOK modulator can also be demodulated coherently. For coherent demodulation of the NBB OOK signal, the NBB OOK signal can be treated as a three-level amplitude-shift-keying (ASK) signal on a symbol-by-symbol basis. In addition, symbols in the NBB OOK signal produced by a modulator applying the NBB OOK modulation scheme are correlated. As a result, coherent demodulation can be carried out jointly on multiple symbols to take advantage of that correlation, rather than on each of the symbols individually (i.e., on a symbol-by-symbol basis). For example, a Viterbi algorithm can be applied to demodulate an NBB OOK signal, which can further improve the error rate performance. This is an additional benefit of the NBB OOK compared with the regular NRZ OOK in some examples, since the regular NRZ OOK can be demodulated only on a symbol-by-symbol basis.

Bipolar Pulse-Position Modulation (BPPM) Scheme

With the regular PPM modulation scheme, each symbol interval of T is split into two equal subintervals, each subinterval being of duration T/2, wherein one of the two subintervals is set to idle (i.e., no transmission). Corresponding to an input bit $a_k$, a positive NRZ pulse of duration T/2 is transmitted in the first or the second subinterval, depending on the value of $a_k$. In other words, the information of the input bit is carried by the pulse position. Without loss of the generality, it is assumed that $a_k=0$ is represented by transmitting the pulse in the first subinterval, and $a_k=1$ is represented by transmitting the pulse in the second subinterval. FIG. 2 shows the waveform of the baseband PPM signal under the foregoing assumption. It is noted that the opposite assumption is also possible.

In alternative examples, the opposite assumption can be used, where $a_k=0$ is represented by transmitting the pulse in the second subinterval, and $a_k=1$ is represented by transmitting the pulse in the first subinterval. With the regular PPM scheme, each symbol has a value of zero in one subinterval and a NRZ pulse of positive polarity in another subinterval.

In accordance with some implementations of the present disclosure, the BPPM scheme can provide improved spectrum efficiency with respect to the regular PPM scheme by introducing correlation into the symbol stream. In the BPPM scheme, the BPPM signal is a three-level bipolar signal, that is, the signal amplitude is +1, 0 or −1, with correlation introduced into the symbols. With the BPPM scheme, a pulse of duration of T/2 is transmitted in the first or the second subinterval to represent the value of an input bit of $a_k$. With the BPPM scheme, each pulse may be of positive or negative polarity, depending on both the current input bit $a_k$ and the previous bit $a_{k-1}$, as illustrated by Table 2 below. This compares with the regular PPM scheme, where all pulses are of positive polarity (i.e., no negative polarity).

Figure 9:
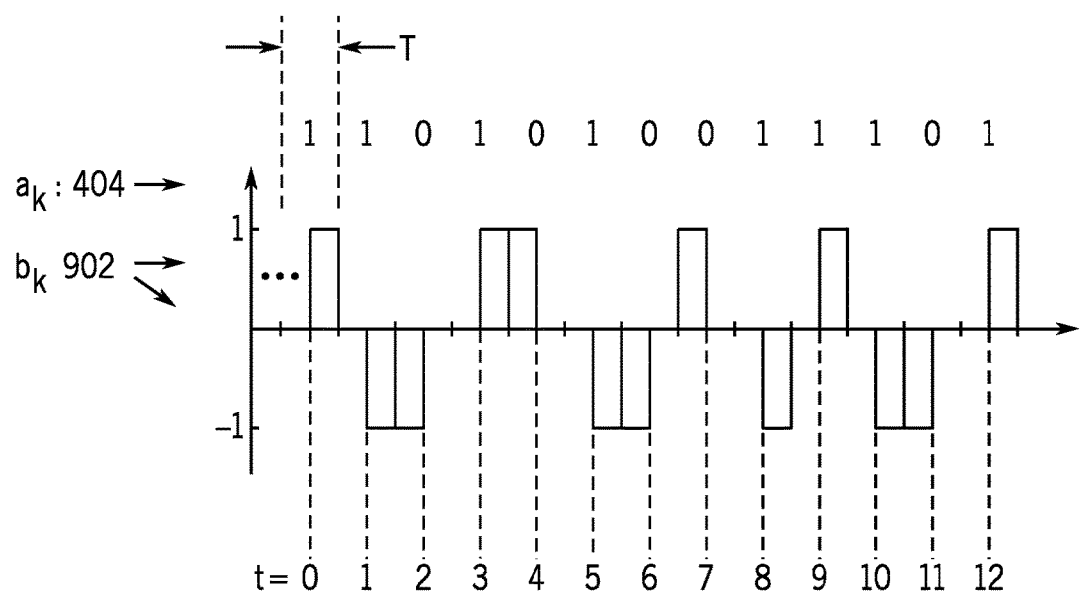
FIG. 9 is a graph of a baseband waveform for a bipolar pulse-position modulation (BPPM) signal, according to further examples.

FIG. 9 shows an example of a baseband waveform 902 for a BPPM signal corresponding to the same data bit stream 404 $\{a_k\}=\{1, 1, 0, 1, 0, 1, 0, 0, 1, 1, 1, 0, 1\}$ as shown in FIG. 4. Within each symbol interval T, there are two subintervals of duration T/2. In some examples, each input bit $a_k=0$ is represented by transmitting a pulse (with a negative or positive polarity) in the first subinterval, and each input bit $a_k=1$ is represented by transmitting a pulse (with a negative or positive polarity) in the second subinterval.

Thus, same as with the regular PPM scheme, BPPM provides an amplitude transition in each BPPM symbol interval. The BPPM signal waveform varies its amplitude more smoothly than the regular PPM waveform, which provides an improved spectrum efficiency for the BPPM signal waveform.

Table 2 below shows an example of a coding rule that can be applied to determine the pulse polarity (+1 or −1) in the respective first subinterval (to represent $a_k=0$) or second subinterval (to represent $a_k=1$) of a symbol interval.

The pulse polarity of a pulse for a current symbol $b_k$ is determined based on the value of the current input bit $a_k$ and the value of the immediately prior input bit $a_{k-1}$. The first row of Table 2 specifies that for the combination $a_k=0$ and $a_{k-1}=0$, the pulse polarity in the first subinterval for the current symbol $b_k$ is toggled from the pulse polarity of the previous symbol $b_{k-1}$. The second row of Table 2 specifies that for the combination $a_k=0$ and $a_{k-1}=1$, the pulse polarity in the first subinterval for the current symbol $b_k$ is maintained the same as the pulse polarity of the previous symbol $b_{k-1}$. The third row of Table 2 specifies that for the combination $a_k=1$ and $a_{k-1}=0$, the pulse polarity in the second subinterval for the current symbol $b_k$ is toggled from the pulse polarity of the previous symbol $b_{k-1}$. The fourth row of Table 2 specifies that for the combination $a_k=1$ and $a_{k-1}=1$, the pulse polarity in the second subinterval for the current symbol $b_k$ is toggled from the pulse polarity of the previous symbol $b_{k-1}$.

TABLE 2

| $a_k$ | $a_{k-1}$ | Pulse Polarity |
|---|---|---|
| 0 | 0 | Toggle pulse polarity |
| 0 | 1 | Keep same pulse polarity |
| 1 | 0 | Toggle pulse polarity |
| 1 | 1 | Toggle pulse polarity |

More simply, Table 2 indicates that:
1) if $a_{k-1}=1$ and $a_k=0$, the polarity of the k-th pulse (for the current symbol $b_k$) is kept unchanged,
2) otherwise, the polarity of the k-th pulse is reversed from the previous pulse.

Table 2 assumes that each bit $a_k=0$ or $a_k=1$ is represented by transmitting a pulse in the first or the second subinterval, respectively. Otherwise, if this assumption is reversed such that each bit $a_k=1$ or $a_k=0$ is represented by transmitting a pulse in the first or the second subinterval, respectively, then the second row of Table 2 is changed to specify "Toggle pulse polarity," and the third row of Table 2 is changed to specify "Keep same pulse polarity." Correspondingly, rule 1) above for Table 2 is changed to "if $a_{k-1}=0$ and $a_k=1$, the polarity of the k-th pulse (for the current symbol $b_k$) is kept unchanged".

With the BPPM scheme, each symbol of the three-amplitude bipolar symbol stream has a specified time duration T, and the specified time duration T of each symbol is split into two subintervals, each of duration T/2. A NRZ pulse is transmitted in one of the two subintervals of each symbol depending on a value of the current input bit $a_k$ of the data bit stream and a value of the prior input bit $a_{k-1}$ of the binary bit stream, where the NRZ pulse transmitted in one of the two subintervals is selectively set to −1 or +1, and the remaining subinterval is set to idle.

With the BPPM scheme, the coding rule can generally specify that:
1) if the NRZ pulse of duration T/2 representing the current input bit $a_k$ is transmitted in the first subinterval and the pulse representing the immediately prior input bit $a_{k-1}$ is transmitted in the second subinterval, the pulse transmitted in the first subinterval for the current input bit $a_k$ keeps the same polarity as the pulse transmitted in the second subinterval for the prior input bit $a_{k-1}$,
2) otherwise, the polarity of the pulse representing the current input bit $a_k$ is toggled from the polarity of the pulse representing the prior input bit $a_{k-1}$.

In a regular PPM signal, all NRZ pulses, each of duration T/2 have the positive polarity. In contrast, in a BPPM signal, each NRZ pulse has either a negative or positive polarity, as shown by FIG. 9. The general rule of the BPPM scheme is that if a previous pulse was transmitted in the second subinterval and the following pulse is to be transmitted in the first subinterval, the following pulse should keep the same polarity as the previous pulse (i.e., adjacent non-zero pulses of the symbol stream keep the same polarity); otherwise the following pulse should reverse the polarity from the polarity of the previous pulse.

Figure 10:
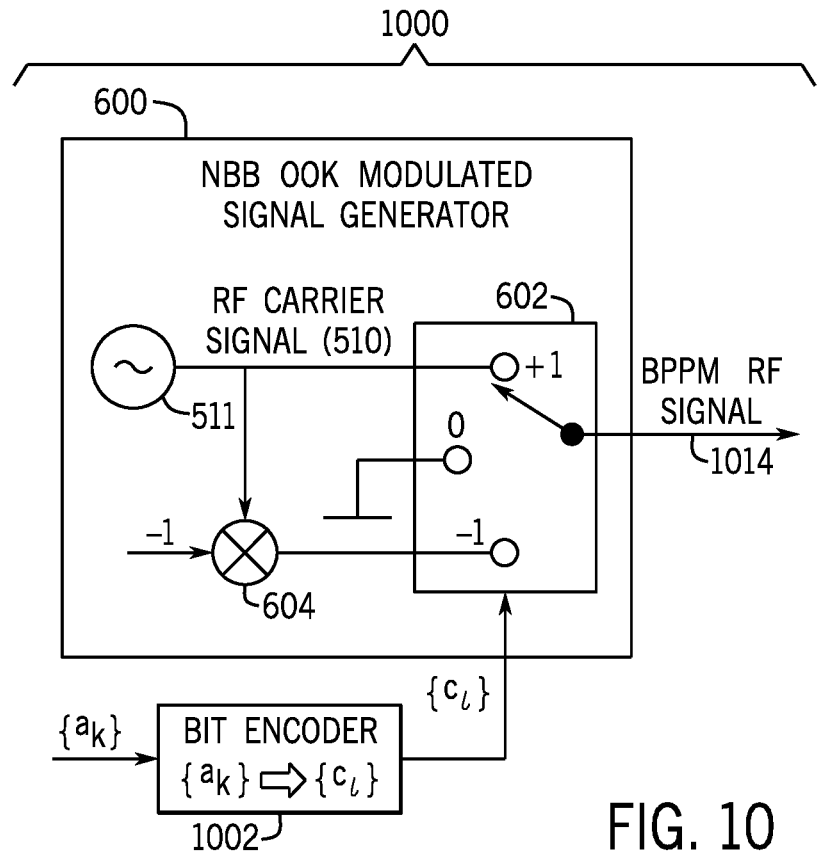
FIG. 10 is a schematic diagram of a BPPM modulated signal generator according to further examples.

FIG. 10 shows an example of a BPPM modulated signal generator 1000 for producing a BPPM RF signal 1014. The modulated signal generator 1000 is an example of the modulated signal generator 304 in FIG. 3. Although a specific example of the modulated signal generator 1000 is shown in FIG. 10, it is noted that in other examples, other circuit arrangements can be used to produce the BPPM RF signal 1014.

The modulated signal generator 1000 includes a bit encoder 1002 and the NBB OOK modulated signal generator 600 of FIG. 6. Whereas the switch 602 in FIG. 6 is controlled directly by the value of the current input bit $a_k$, the switch 602 in FIG. 10 is controlled by $c_l$, which is a parameter that is two bits in length produced by encoding a value of $a_k$ into a pair of bits $c_l$.

The bit encoder 1002 extends the input bit stream $\{a_k\}$ into a new bit stream of double length, denoted by $\{c_l\}$, by mapping $a_k=0$ into a pair of bits (1, 0) and mapping $a_k=1$ into a pair of bits (0, 1). In each pair of bits in $\{c_l\}$, 1 indicates the position of the pulse in the two subintervals of a symbol. This is consistent with the assumption that $a_k=0$ and $a_k=1$ are represented respectively by the first and second subintervals, where the pulse is transmitted. Otherwise if the assumption is reversed, then $a_k=0$ and $a_k=1$ should be mapped into (0, 1) and (1, 0), respectively.

The bit stream $\{c_l\}$ produced by the bit encoder 1002 is provided to the control input of the switch 602 of the NBB OOK modulated signal generator 600, which selectively connects the output BPPM RF signal 1014 to one of the +1 terminal, 0 terminal, and −1 terminal based on a respective input bit in $c_l$.

In FIG. 10, the output of the switch 602 is controlled by the value of $c_l$, such that the output of the switch 602 is connected to the 0 terminal whenever a bit of $c_l$ is 0, and stays at the 0 terminal until a new bit of $c_l$ of value 1 arrives. On the other hand, when a bit of $c_l$ is 1, the output of the switch 602 is connected to either the +1 terminal or the −1 terminal, complying with the state transition pattern as shown in FIG. 7, and stays at the respective +1 terminal or −1 terminal until a new bit of $c_l$ with value 0 arrives. The state transition pattern shown in FIG. 7 indicates that when a bit of $c_l$ changes from 0 to 1, the output of the switch 602 changes from the 0 terminal to the −1 terminal if the previous change was from the +1 terminal to the 0 terminal, or from 0 terminal to the +1 terminal if the previous change was from the −1 terminal to the 0 terminal.

In FIG. 10, the NBB OOK modulated signal generator 600 is working at a clock rate of 2/T, since the clock rate of $\{c_l\}$ is twice of the clock rate of $\{a_k\}$.

Figure 11:
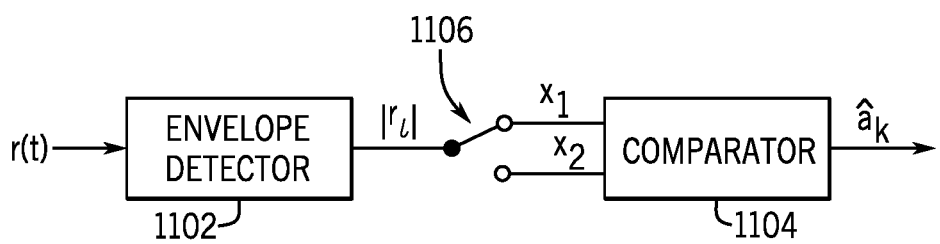
FIG. 11 is a block diagram of a demodulator in a receiver to demodulate a BPPM signal according to further examples.

The BPPM signal 1014 produced by the BPPM modulated signal generator 1000 can be demodulated non-coherently using a non-coherent demodulator as shown in FIG. 11, which includes an envelope detector 1102 and a comparator 1104 (which correspond to the envelope detector 324 and the comparator 326, respectively, of FIG. 3). The envelope detector 1102 receives an BPPM signal r(t) transmitted over the air. The envelope detector 1102 outputs a value $|r_l|$ that represents the envelope of r(t) for each subinterval.

The comparator 1104 has two inputs: an $x_1$ input and an $x_2$ input. A switch 1106 connects the $x_1$ input to the signal $|r_l|$ in response to l being even, and connects the $x_2$ input to the signal $|r_l|$ in response to l being odd. In the example, l=2k or 2k+1, for k=0, 1, . . . .

For each received symbol, envelope detection can be performed by the envelope detector 1102 in both of the first and second subintervals, yielding two absolute values $|r_{2k}|$ and $|r_{2k+1}|$, respectively. The comparator 1104 compares the value of $x_1$ (connected to $|r_{2k}|$ by the switch 1106 in the first subinterval, i.e., l is even) to the value of $x_2$ (connected to $|r_{2k+1}|$ by the switch 1106 in the second subinterval, i.e., l is odd). The comparator sets $\hat{a}_k=1$ if $x_2>x_1$ and $\hat{a}_k=0$ otherwise.

The foregoing assumes that $a_k=0$ and $a_k=1$ are respectively represented by the first and second subintervals where the pulse is transmitted. Otherwise if the assumption is reversed, then the decision should be $\hat{a}_k=0$ if $x_2>x_1$ and $\hat{a}_k=1$ otherwise.

In other examples, coherent demodulation of the BPPM signal can be performed. Compared to the regular PPM signal, the BPPM signal has a special feature when coherent demodulation is used. Since symbols in the BPPM signal are correlated, coherent demodulation can be carried out jointly on multiple symbols to take advantage of that correlation, rather than on each of the symbols individually on the symbol-by-symbol basis. For example, the Viterbi algorithm can be applied to demodulate the BPPM signal to improve the error rate performance.

System Architecture

The various circuitry described above, such as those in the transmitter 300 or receiver 302, including a modulator, a modulated signal generator, a demodulator, an envelope detector, and a comparator, can be implemented using respective hardware processing circuits. A hardware processing circuit can include any one or some combination of a microprocessor, a digital signal processor, a core of a multi-core microprocessor, a microcontroller, a programmable integrated circuit, a programmable gate array, or another hardware processing circuit.

In further examples, any or some combination of the foregoing components of the transmitter 300 or receiver 302 can be implemented as a combination of a hardware processing circuit and machine-readable instructions executable on the hardware processing circuit.

The machine-readable instructions can be stored in a non-transitory machine-readable or computer-readable storage medium. The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of a device comprising a processor, comprising:
   encoding a binary bit stream of input bits into a three-amplitude bipolar symbol stream of symbols, the encoding using a coding rule that specifies setting a value of a respective symbol of the symbol stream based on a respective input bit of the binary bit stream and a prior input bit of the binary bit stream that is prior to the respective input bit, the coding rule further specifying that adjacent non-zero pulses keep the same polarity, wherein a signal of each symbol of the three-amplitude bipolar symbol stream selectively has a value of −1, 0, or +1, wherein each symbol of the three-amplitude bipolar symbol stream has a specified time duration, and the specified time duration of each symbol is split into two subintervals, wherein a pulse is transmitted in one of the two subintervals of each symbol depending on a value of the respective input bit of the binary bit stream and a value of the prior input bit of the binary bit stream, and wherein the pulse transmitted in one of the two subintervals is selectively set to −1 or +1, and modulating a radio frequency (RF) carrier signal using the symbol stream to produce a modulated RF carrier signal.

2. The method of claim 1, wherein the coding rule further specifies that non-adjacent non-zero pulses of the symbol stream toggle their polarity alternately.

3. The method of claim 1, wherein the coding rule further specifies that if the respective input bit and the prior input bit are each equal to a first element of a binary set, then a pulse polarity in a first subinterval of a current symbol is toggled from a pulse polarity of a previous symbol.

4. The method of claim 3, wherein the coding rule further specifies that if the respective input bit and the prior input bit are each equal to a second element of the binary set, then a pulse polarity in a second subinterval of the current symbol is toggled from the pulse polarity of the previous symbol.

5. The method of claim 4, wherein the coding rule further specifies that if the respective input bit is equal the second element of the binary set and the prior input bit is equal the first element of the binary set, then the pulse polarity in the second subinterval of the current symbol is toggled from the pulse polarity of the previous symbol.

6. The method of claim 5, wherein the coding rule further specifies that if the respective input bit is equal to the first element of the binary set and the prior input bit is equal to the second element of the binary set, then the pulse polarity in the first subinterval of the current symbol is maintained the same as the pulse polarity of the previous symbol.

7. The method of claim 1, wherein the coding rule further specifies that:
   if a pulse representing the respective input bit is transmitted in a first subinterval and the pulse representing the prior input bit is transmitted in a second subinterval, the pulse transmitted in the first subinterval for the respective input bit keeps the same polarity as the pulse transmitted in the second subinterval for the prior input bit,
   otherwise, the polarity of the pulse representing the respective input bit is toggled from the polarity of the pulse representing the prior input bit.

8. The method of claim 1, further comprising transmitting, by the device, the modulated RF signal to a receiver to awaken the receiver.

9. A transmitter comprising:
   a modulator to:
      encode a data bit stream of input bits into a three-amplitude bipolar symbol stream of symbols, the encoding using a coding rule that specifies setting a value of a respective symbol of the symbol stream based on a respective input bit of the data bit stream and a prior input bit of the data bit stream that is immediately prior to the respective input bit, the coding rule further specifying that adjacent non-zero pulses keep the same polarity, wherein each symbol of the three-amplitude bipolar symbol stream has a specified time duration, and the specified time duration of each symbol is split into two subintervals, and wherein a pulse is transmitted in one of the two subintervals of each symbol depending on a value of the respective input bit of the data bit stream and a value of the prior input bit of the data bit stream, wherein the pulse transmitted in one of the two subintervals is selectively set to −1 or +1; and
      modulate a radio frequency (RF) carrier signal using the symbol stream to produce a modulated RF carrier signal.

10. The transmitter of claim 9, wherein the coding rule further specifies that non-adjacent non-zero pulses of the symbol stream toggle their polarities alternately.

11. The transmitter of claim 9, wherein the modulator comprises:
a multiplier with a multiplier factor of −1, the multiplier to generate an inversed carrier signal that is the same as a carrier signal but with opposite polarity; and
a switch having first, second, and third inputs, a control input, and an output to provide a modulated signal, wherein the first input receives the carrier signal, the second input is connected to ground, the third input receives the inversed carrier signal, and the control input receives a control signal based on the data bit stream.

12. The transmitter of claim 11, wherein the switch is to connect the output to the second input in response to a bit of the control signal set to a first element of a binary set, and the output is to remain connected to the second input until a bit of the control signal set to a second element of the binary set different from the first element of the binary set is received by the control input of the switch.

13. The transmitter of claim 12, wherein the output of the switch is connected to one of the first input and the third input in response to a bit of the control signal set to the second element of the binary set, and the output is to remain connected to the first or third input until a bit of the control signal set to the first element of the binary set is received by the control input of the switch.

14. The transmitter of claim 13, wherein the output of the switch is connected to the first input in response to a bit of the control signal set to the second element of the binary set if a prior change of the output of the switch is a change in connection of the output from the third input to the second input, and
wherein the output of the switch is connected to the third input in response to a bit of the control signal set to the second element of the binary set if a prior change of the output of the switch is a change in connection of the output from the first input to the second input.

15. The transmitter of claim 11, wherein the control signal is the data bit stream.

16. The transmitter of claim 11, further comprising:
an encoder to encode the data bit stream to produce the control signal, wherein the encoder encodes each respective input bit of the data bit stream into a respective pair of bits that form part of the control signal.

17. The transmitter of claim 16, wherein if the respective input bit is set to a first element of a binary set, then the respective pair of bits includes a first bit set to 0 and a second bit set to 1, and
if the respective input bit is set to a second element of the binary set different from the first element of the binary set, then the respective pair of bits includes the first bit set to 1 and the second bit set to 0.

18. The transmitter of claim 12, wherein a signal of each symbol of the three-amplitude bipolar symbol stream selectively has a value of −1, 0, or +1.

19. The transmitter of claim 12, further comprising an antenna to transmit the modulated RF carrier signal.

20. A receiver comprising:
an envelope detector to detect an envelope of a modulated radio frequency (RF) signal modulated using a modulation scheme that encodes a data bit stream of input bits into a three-amplitude bipolar symbol stream of symbols using a coding rule that specifies setting a value of a respective symbol of the symbol stream based on a respective input bit of the binary bit stream and a prior input bit of the binary bit stream that is prior to the respective input bit, the coding rule further specifying that adjacent non-zero pulses keep the same polarity, wherein the modulation scheme further splits each symbol of the symbol stream into two subintervals; and
a comparator to compare an output of the envelope detector to a specified input to produce data bits corresponding to the input bits, the comparator to compare a value in a first subinterval of the two subintervals to a value in a second subinterval of the two subintervals.

21. The receiver of claim 20, wherein the specified input comprises a threshold, and the comparator compares the output of the envelope detector to the threshold.

* * * * *